United States Patent
Cho et al.

(10) Patent No.: US 7,198,237 B2
(45) Date of Patent: Apr. 3, 2007

(54) STAND ASSEMBLY FOR MONITOR

(75) Inventors: Gyu Yeol Cho, Gumi-si (KR); Chang Woo Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/005,027

(22) Filed: Dec. 7, 2004

(65) Prior Publication Data

US 2005/0247832 A1  Nov. 10, 2005

(30) Foreign Application Priority Data

May 6, 2004  (KR) ...................... 10-2004-0031766
May 21, 2004  (KR) ...................... 10-2004-0036340

(51) Int. Cl.
   A47F 5/12  (2006.01)
(52) U.S. Cl. ................. 248/133; 248/121; 248/123.11; 248/276.1; 361/681
(58) Field of Classification Search ............ 248/276.1, 248/278.1, 125.1, 917–923, 121, 123.11, 248/133; 361/681, 682, 683
See application file for complete search history.

(56) References Cited

U.S. PATENT DOCUMENTS

| | | | |
|---|---|---|---|
| 5,947,429 A * | 9/1999 | Sweere et al. ......... 248/123.11 |
| 6,568,034 B2 * | 5/2003 | Cho ............................ 16/337 |
| 6,672,553 B1 * | 1/2004 | Lin ........................ 248/276.1 |
| 6,779,234 B1 * | 8/2004 | Lu et al. ....................... 16/340 |
| 6,822,857 B2 * | 11/2004 | Jung et al. .................. 361/681 |
| 6,867,962 B2 * | 3/2005 | Cho et al. ................... 361/681 |
| 6,886,701 B2 * | 5/2005 | Hong et al. ................... 211/99 |
| 2004/0012917 A1 * | 1/2004 | Jung et al. .................. 361/681 |
| 2004/0211866 A1 * | 10/2004 | Jung et al. .................. 248/133 |
| 2004/0250380 A1 * | 12/2004 | Cho et al. ..................... 16/340 |
| 2005/0002159 A1 * | 1/2005 | Jeong ......................... 361/683 |
| 2005/0017135 A1 * | 1/2005 | Jung et al. .................. 248/133 |
| 2005/0247832 A1 * | 11/2005 | Cho et al. ................... 248/133 |

FOREIGN PATENT DOCUMENTS

EP      1505333     * 9/2005

* cited by examiner

Primary Examiner—Carl D. Friedman
Assistant Examiner—Tan Le
(74) Attorney, Agent, or Firm—Ked & Associates, LLP

(57) ABSTRACT

A stand assembly for a monitor is provided. The stand assembly includes a base and a stand having an upper end rotatably coupled to a monitor body, and a lower end rotatably coupled to the base. The stand assembly also includes torque correcting means for generating a torque which varies non-linearly with rotation of the stand, thus allowing a tilt angle of a monitor body coupled to the stand assembly to be easily adjusted throughout a large range of motion.

45 Claims, 15 Drawing Sheets

STAND ASSEMBLY FOR MONITOR

CROSS-REFERENCE TO RELATED APPLICATIONS

This application claims the benefit of Korean Application Nos. P2004-31766, filed on May 6, 2004, and P2004-36340, filed on May 21, 2004, which are hereby incorporated by reference as if fully set forth herein.

BACKGROUND OF THE INVENTION

1. Field of the Invention

The present invention relates to a stand assembly for supporting a monitor on a floor, and more particularly, to a stand assembly for a flat monitor for rotatably supporting the flat monitor.

2. Discussion of the Related Art

In general, in order to use flat monitors, such as LCD monitors, at desks or tables, stands for supporting the monitors are required. The stand is coupled to a backside of the monitor with a hinge assembly so that a user can adjust a tilting angle of the monitor to desired degrees.

A structure of related art monitor apparatus will be described briefly, with reference to FIG. 1.

There is a stand 3 at an upper end and a lower end thereof rotatably coupled to a monitor body 1 and a base 2 on a floor, with a monitor hinge 5 and a base hinge 6 respectively, thereby connecting the monitor body 1 and the base 2.

At opposite sides of the stand 3, there are one pair of parallel link members 7 for converting rotation of the stand 3 with respect to the base 2 to rotation of the monitor body 1. The link members 7 serve to rotate the monitor body 1 to a predetermined angle interlocked with rotation of the stand 3 with respect to a plane of the base 2. Of course, rotation of only the monitor body with respect to the stand is also possible.

The base hinge 6 is provided with a first base hinge 6a, and a second base hinge 6b, and the first base hinge 6a is provided with a torsion spring 6c for exerting an elastic force in a direction opposite to a downward rotation direction of the stand 3 toward the plane of base 2, to offset a torque generated by gravity of the monitor body 1.

Each of the first base hinge 6a and the monitor hinge 5 has a hinge shaft (not shown) inserted in an inserting hole therein, and engaged with an inside circumferential surface of the inserting hole with a predetermined friction, to support the torque generated by the gravity of the monitor body 1, too.

However, the related art monitor apparatus has the following problems.

When the user applies pressure to the monitor body in an upper or lower direction, the stand 3 rotates about the base hinge 6, to adjust a tilting angle of the stand 3 with respect to the base 1. In this instance, a tilting angle of the monitor body is adjusted by the link members, automatically. That is, at the time of tilting angle adjustment of the stand 3 with respect to the base 2, the tilting angle of the monitor body 1 with respect to the stand 3 is also adjusted automatically, and the present state is maintained.

Of course, if the monitor body 1 at a top or a bottom thereof is pushed backward, or pulled forward, the monitor body 1 rotates about the monitor hinge 5, to adjust the tilting angle of the monitor body 1 with respect to the stand 3 only.

However, since the related art monitor apparatus has the torque caused by the gravity of the monitor body 1 supported by the torsion spring 6c and friction of the hinge shaft (not shown), if the tilting angle θ of the stand 3 with respect to the base 2 is outside of a predetermined range of angle, since application of a working force is required, which is greater than a torque required for adjustment of the tilting angle of the monitor body, smooth adjustment of the tilting angle can not be achieved.

In more detail, referring to FIG. 2, the torque Tn required for supporting the monitor body 1 varies with the tilting angle θ following a locus of a curved line. However, the torque Ts available from the torsion spring 6c varies with the tilting angle θ following a locus of a straight line, and a total torque Ta available from the torsion spring 6c and friction of the hinge shaft (not shown) also varies following a locus of a straight line. This is because the torque Ts of the torsion spring is proportional to a spring constant and a torsion angle, and the friction is constant regardless of the tilting angle.

Therefore, in a case the tilting angle is smaller or greater than a certain range, the working force required varies with the tilting angle significantly due to a great difference between the required torque Tn and an actual available torque Ta, failing to achieve the smooth operation.

SUMMARY OF THE INVENTION

Accordingly, the present invention is directed to a stand assembly for a monitor that substantially obviates one or more problems due to limitations and disadvantages of the related art.

An object of the present invention is to provide a stand assembly for a monitor, which enables smooth rotation of the monitor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stand assembly for a monitor includes a base, a monitor body, a stand having an upper end rotatably coupled to the monitor body, and a lower end rotatably coupled to the base, for supporting the monitor body, and torque correcting means for generating a torque non-linearly varied with rotation of the stand.

Preferably, the coupling of the stand to the base further includes at least one of friction torque generating means for generating a friction torque, and torsional torque generating means for generating a torsional torque.

Preferably, the coupling of the monitor body to the stand further includes at least one of friction torque generating means for generating a friction torque, and torsional torque generating means for generating a torsional torque.

The friction torque generating means may be at least one combination of disc springs arranged substantially vertical to a rotation direction and a curling spring arranged in a direction the same with the rotation direction.

Preferably, the torsional torque generating means is a torsion spring.

The torque correcting means may be an elastic member having one end rotatably secured at a position away from a rotation axis of the stand with respect to the base, and the other end rotatably, and position variably coupled at a position away from a rotation axis of the monitor body with respect to the stand, for varying a length thereof with rotation of the stand, to vary a elastic force.

In more detail, preferably, the torque correcting means includes a rotating member rotatably coupled to the upper end of the stand, a first link bar, and a second link bar, each having one end connected to a position away from the rotation axis of the stand with respect to the base, and the other end connected to the rotating member at a position away from the rotation axis of the monitor body with respect to the stand, and an elastic member having one end secured to the first link bar, and the other end secured to the second link bar, for generating an elastic force as the stand rotates.

Preferably, the elastic member is mounted such that the elastic member applies elastic force to the first, and second link bars in a diagonal direction.

In another aspect of the present invention, a stand assembly for a monitor includes a base on a floor, a stand having an upper end rotatably coupled to a monitor body, and a lower end rotatably coupled to the base, for supporting the monitor body, a monitor hinge having a hinge shaft for rotatably coupling the upper end of the stand to the monitor body, a base hinge for rotatably coupling the lower end of the stand to the base, a rotating member rotatably mounted on the upper end of the stand, a first link bar, and a second link bar parallel to each other, each having one end connected to the rotating member, and the other end connected to the base hinge, and an elastic member having one end secured to the first link bar, and the other end secured to the second link bar, for applying an elastic force to the first, and second link bars according to titling angle variation of the stand.

Thus, the present invention permits to obtain a smooth working force, enabling the user to make easy adjustment of a tilting angle throughout entire moving range by uniform force because the working force acts non-linearly in correspondence to required torque, by torque of the torsion springs and/or disc springs inside of the base hinge, and torque of the elastic member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A structure and operation of the stand assembly for a monitor in accordance with a preferred embodiment of the present invention will be described with reference to FIGS. 3~9.

Figure 1:
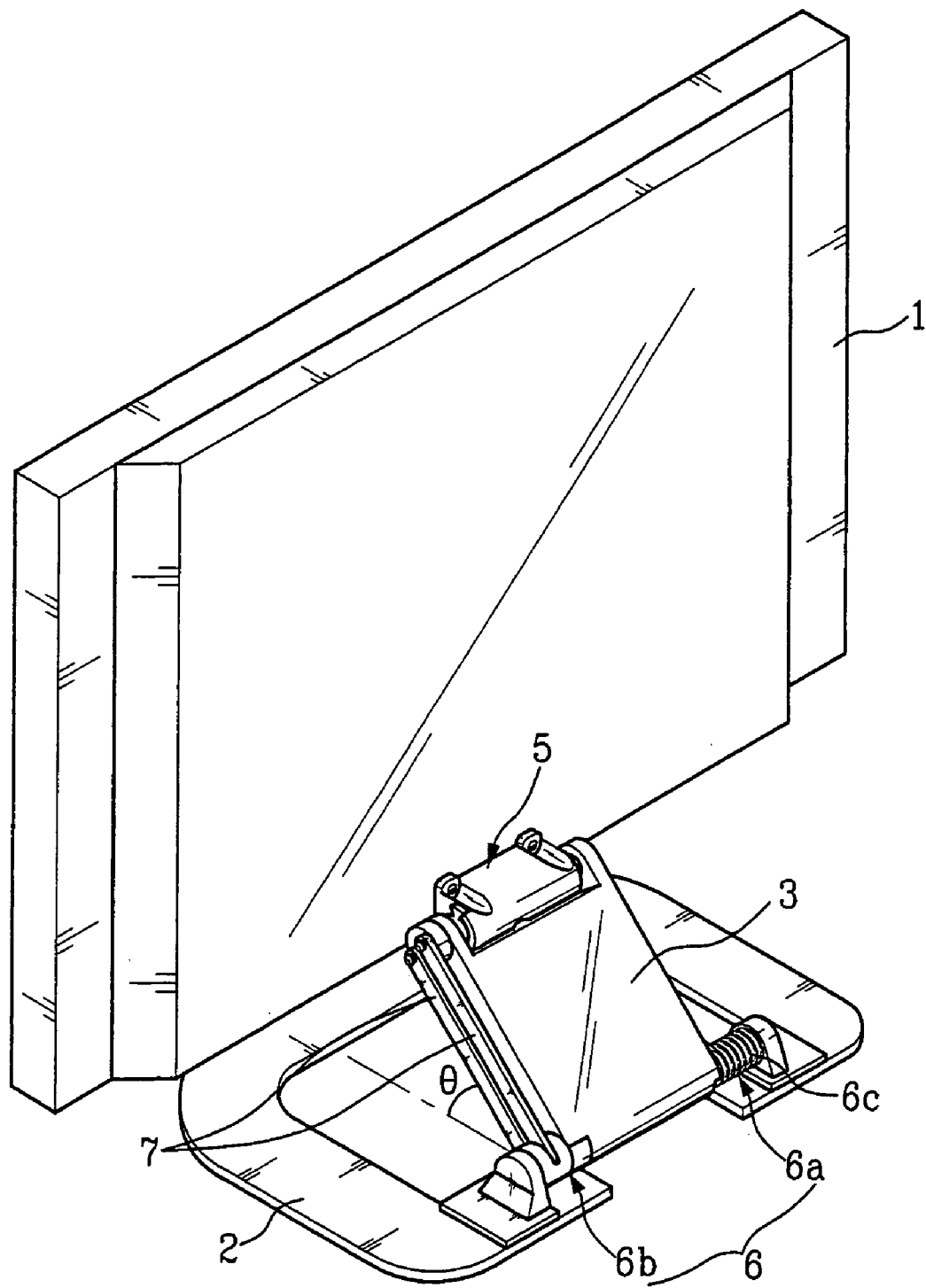
FIG. 1 illustrates a perspective view of a related art flat monitor apparatus.
Figure 2:
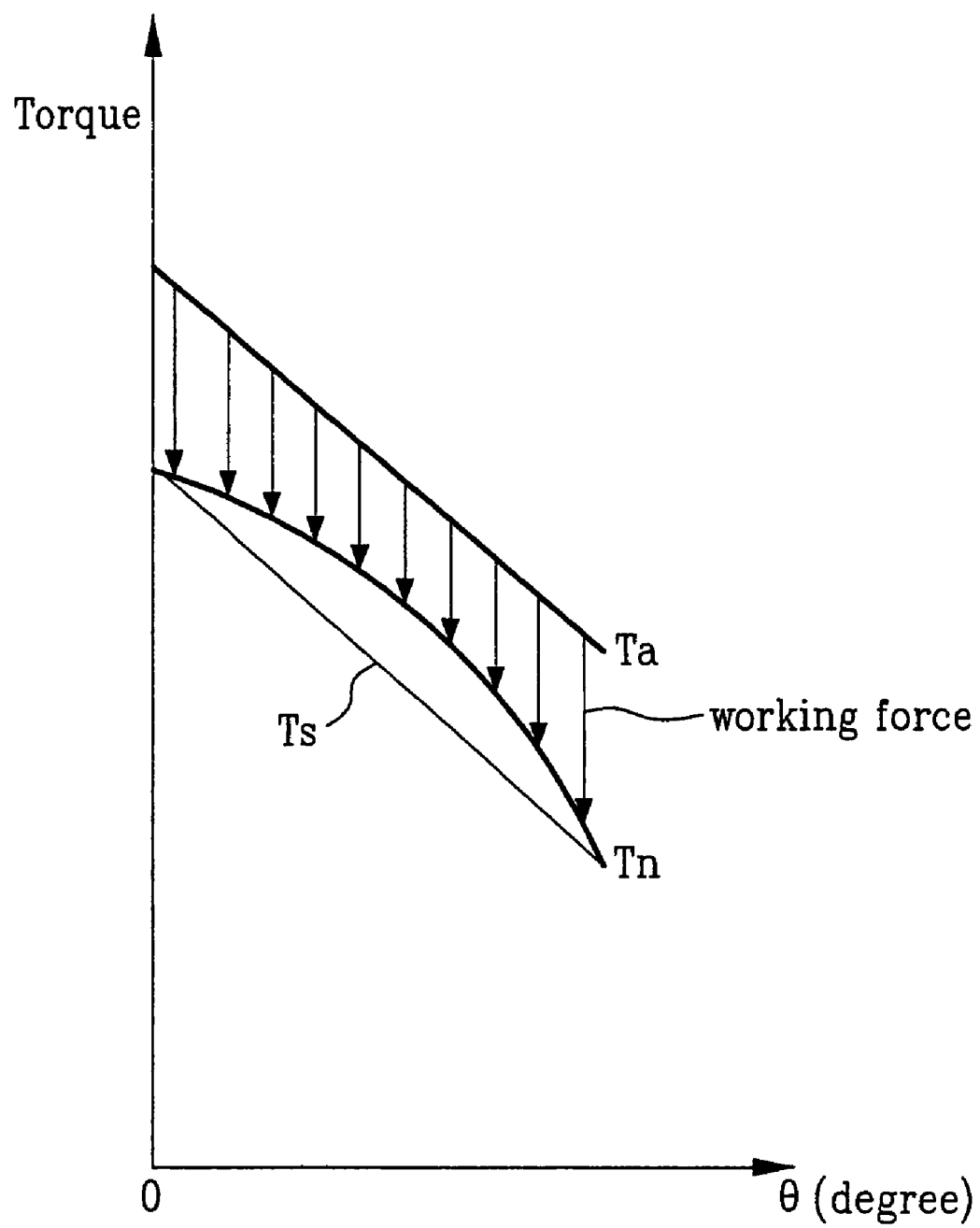
FIG. 2 illustrates a graph of a required torque vs. an actual available torque of a related art stand assembly.
Figure 3:
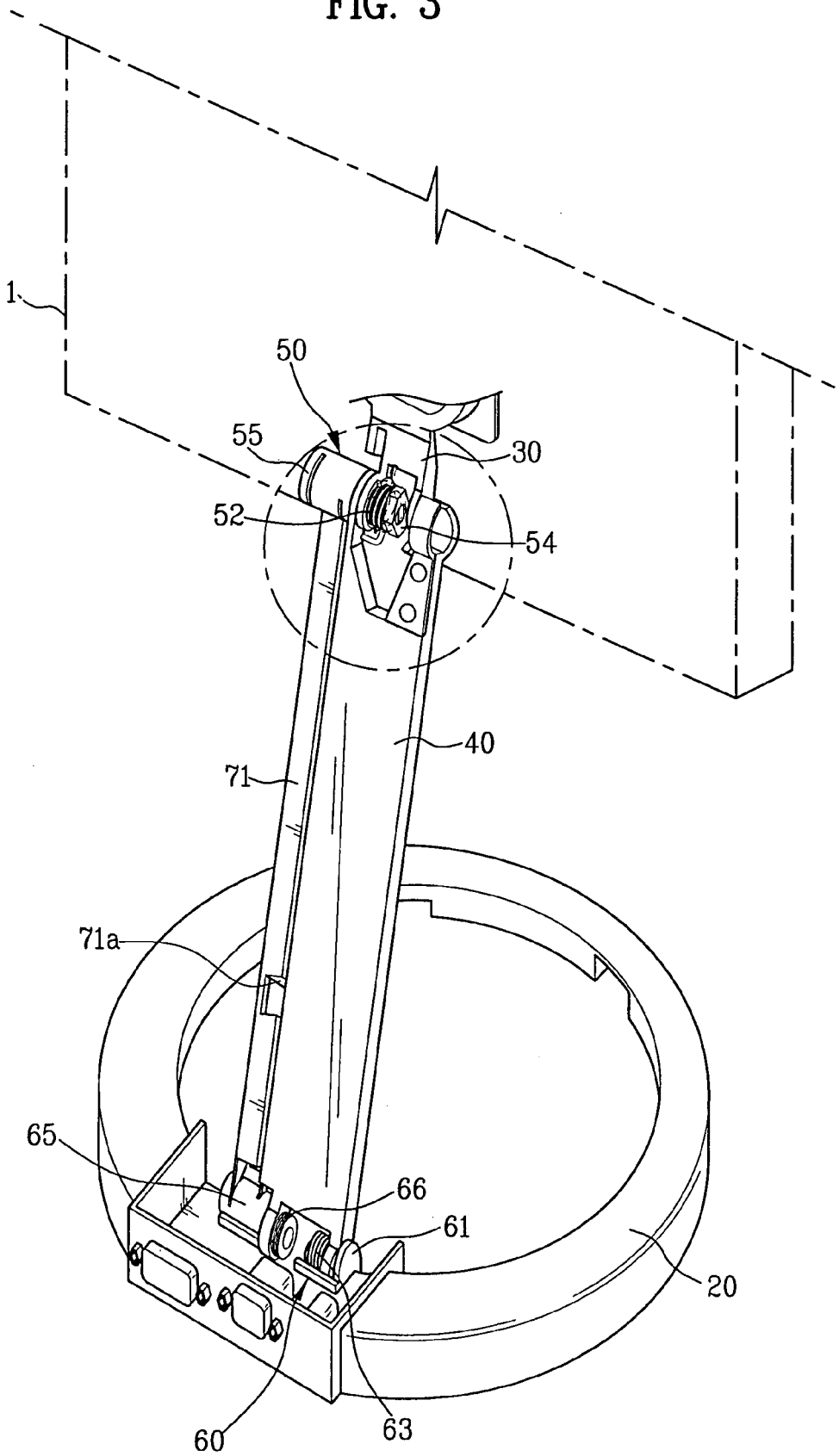
FIG. 3 illustrates a perspective view of a stand assembly for a monitor in accordance with a preferred embodiment of the present invention.

Referring to FIG. 3, there is a pivot bracket 30 fixedly secured to a backside of a monitor body 1, for pivoting the monitor body 1 on an axis perpendicular to a plane of a monitor screen. There is an upper end of the stand 40 rotatably coupled to a lower end of the pivot bracket 30 with a monitor hinge 50. A lower end of the stand 40 is rotatably coupled to the base 20 with a base hinge 60. Of course, the monitor body 1 may be coupled to the stand without the pivot bracket 30.

At one side of the stand 40, there are a first link bar 71 and a second link bar 72 (see FIG. 5) arranged parallel to each other as angle adjusting means for keeping an angle of a monitor body 1 constant interlocked with rotation of the stand 40 with respect to the base 20. The first, and second link bars 71, and 72 have upper ends rotatably secured to a rotating member 55 mounted on the monitor hinge 50, and lower ends rotatably secured to a second base bracket 65 of the base hinge 60.

It is preferable that the first, and second link bars 71, and 72 have the same lengths.

Figure 4:
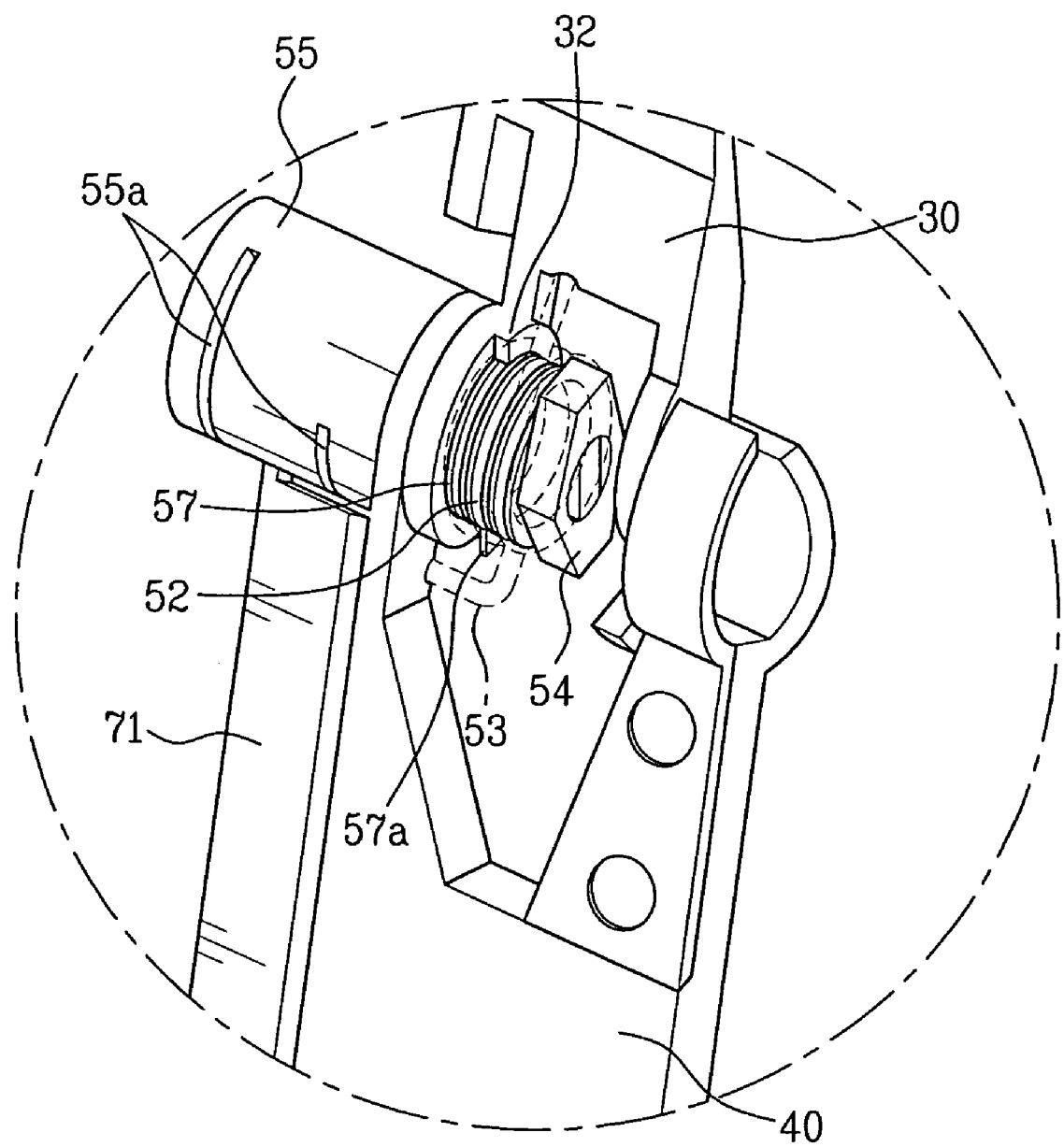
FIG. 4 illustrates an enlarged perspective view of a monitor hinge of a stand assembly for a monitor in FIG. 3.
Figure 5:
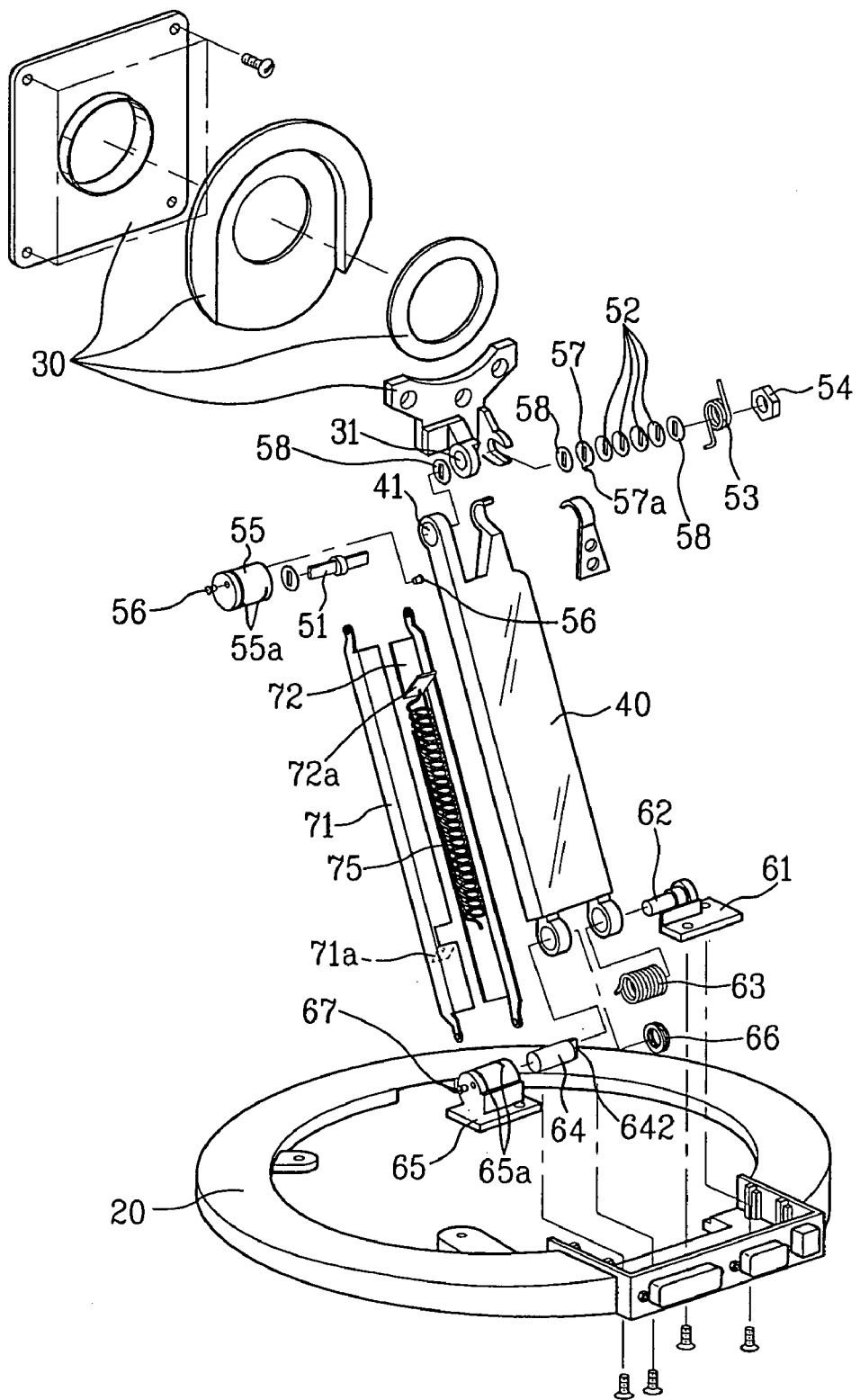
FIG. 5 illustrates a disassembled perspective view of the stand assembly in FIG. 3.

Referring to FIGS. 4 and 5, the monitor hinge 50 includes an upper hinge shaft 51 inserted both in an insertion hole 31 in the lower end of the pivot bracket 30, and an insertion hole 41 in one side of the upper end of the stand 40.

The upper hinge shaft 51 has a cylindrical middle portion 512 for inserting both in the insertion hole 31 in the pivot bracket 30 and the insertion hole 41 in the stand 40, and opposite side portions 514, and 516 each cut flat starting from the middle portion 512. One flat end portion 514 of the upper hinge shaft 51 is inserted, and secured to a hole (not shown) formed in a shape complementary to the rotating member 55. According to this, the rotating member 55 rotates together with the upper hinge shaft 51.

Figure 6:
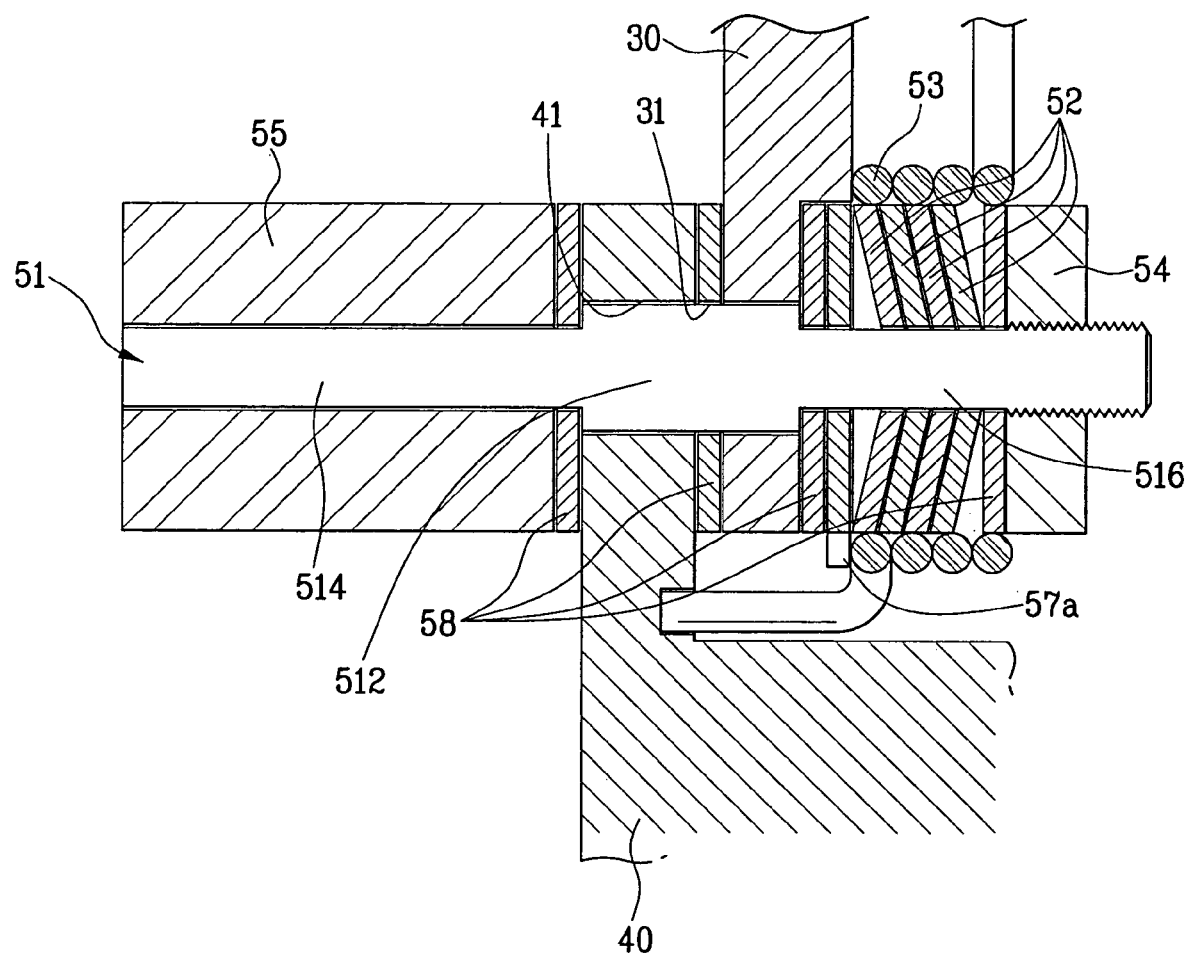
FIG. 6 illustrates a section of key parts of the monitor hinge of the stand assembly in FIG. 4.

Referring to FIGS. 5 and 6, it is preferable that the other one flat end portion 516 of the upper hinge shaft 51 has friction torque generating means, for an example, a plurality of disc springs 52 of conical ring shapes inserted therein overlapped with one another. The disc springs 52 generate torque by friction between the upper hinge shaft 51 and the pivot bracket 30 as the disc springs 52 are brought into close contact with a surface of the pivot bracket 30. Therefore, application of a working force greater than the friction is required for rotating the monitor body 1. At an outer side of the disc springs 52, there is a nut 54 threaded to an end of the upper hinge shaft 51 for bringing the disc springs 52 into close contact with the surface of the pivot bracket 30.

It is preferable that the monitor hinge 50 also has rotating angle limiting means for limiting a rotation angle of the monitor body 1 with respect to the stand 40. In the embodiment, the rotating angle limiting means includes a stopper 57 of a washer shape having a stopper tip 57a formed on an outside circumference as one unit therewith, for engagement with the flat portion of the upper hinge shaft 51, and a step 32 at the pivot bracket 30 in a rotation locus of the stopper 57 for bringing into contact with, and holding the stopper 57.

It is preferable that there are flat washers 58 between the rotating member 55 and the stand 40, between the stand 40 and the pivot bracket 30, between the pivot bracket 30 and the stopper 57, and between the disc springs 52 and the nut 54, respectively.

It is preferable that, at an outer side of the disc springs 52, there is torsional torque generating means, for an example, an upper torsion spring 53 mounted to surround outside circumferential surfaces of the disc springs 52. The upper torsion spring 53 has one end secured to the pivot bracket 30, and the other end secured to the stand 40 for producing an elastic force as the torsion spring 53 is twisted.

Though the other end of the torsion spring 53 is designed to be secured to the stand 40 in the embodiment, different from this, by securing a separate holding plate to the upper hinge shaft 51, and fastening the other end of the torsion spring 53 to the holding plate, the other end of the torsion spring can be secured to the upper hinge shaft.

In the meantime, referring to FIGS. 3 and 5, the base hinge 60 includes a first base bracket 61 fixedly secured to the base 20, a first lower hinge shaft 62 formed as one unit with the first base bracket 61 to pass one side of the lower end of the stand 40, a second base bracket 65 fixedly secured to the base 20 at a location spaced a distance away from the first base bracket 65, and a second lower hinge shaft 64 passed through, and engaged with the second base bracket 65 and the other side of the lower end of the stand 40. Of course, different from this, only one base bracket and hinge shaft can also be used.

The torque correcting means is an elastic member having one end rotatably secured at a position away from a rotation axis of the stand with respect to the base, and the other end rotatably, and position variably coupled at a position away from a rotation axis of the monitor body with respect to the stand, for varying a length thereof with rotation of the stand, to vary a elastic force.

Mounted on the first lower hinge shaft 62 of the first base bracket 61, there is a lower torsion spring 63 for supporting the stand 40 against the first base bracket 61, elastically. The lower torsion spring 63 serves to exert torque in a direction opposite to loads of the monitor body 1 and the stand 40, to prevent the stand 40 from folding automatically by the load of the monitor body 1, to maintain a state the tilting angle of the monitor body 1 is adjusted. It is preferable that the elastic force of the lower torsion spring 63 is slightly lower than the torque generated by the loads of the monitor body 1 and the stand 40.

The second lower hinge shaft 64 has a cut flat end portion 642, in which the friction torque generating means, i.e., the plurality of disc springs 66 of conical ring shape are inserted overlapped with one another. It is preferable that the disc springs 66 are brought into close contact with the lower end of the stand 40 until predetermined friction is formed, caulked, and fixedly secured.

In the meantime, referring to FIG. 5, upper ends of the first link bar 71 and the second link bar 72 are inserted in spaced slots 55a in the rotating member 55 formed along a circumferential direction thereof, and rotatably fastened to the rotating member 55 with a connection pin 56.

Lower ends of the first link bar 71 and the second link bar 72 are inserted in slots 65a in the second base bracket 65 formed along a circumferential direction thereof, and rotatably fastened to the second base bracket 65 with connection pins 67.

It is preferable that the first link bar 71 and the second link bar 72, each having an 'L' section, are mounted opposite to each other in a state the first link bar 71 and the second link bar 72 can move in different planes, such that the first link bar 71 and the second link bar 72 form a substantially rectangular section when the first link bar 71 and the second link bar 72 are fastened to the rotating member 55 and the second base bracket 65.

The first, and second link bars 71, and 72 have torque correcting means, for an example, holding pieces 71a, and 72a on upper and lower sides thereof respectively each formed as one unit therewith at a right angle thereto, and ends of tension springs 75 are secured to the holding pieces 711a, and 72a, respectively.

Figure 9:
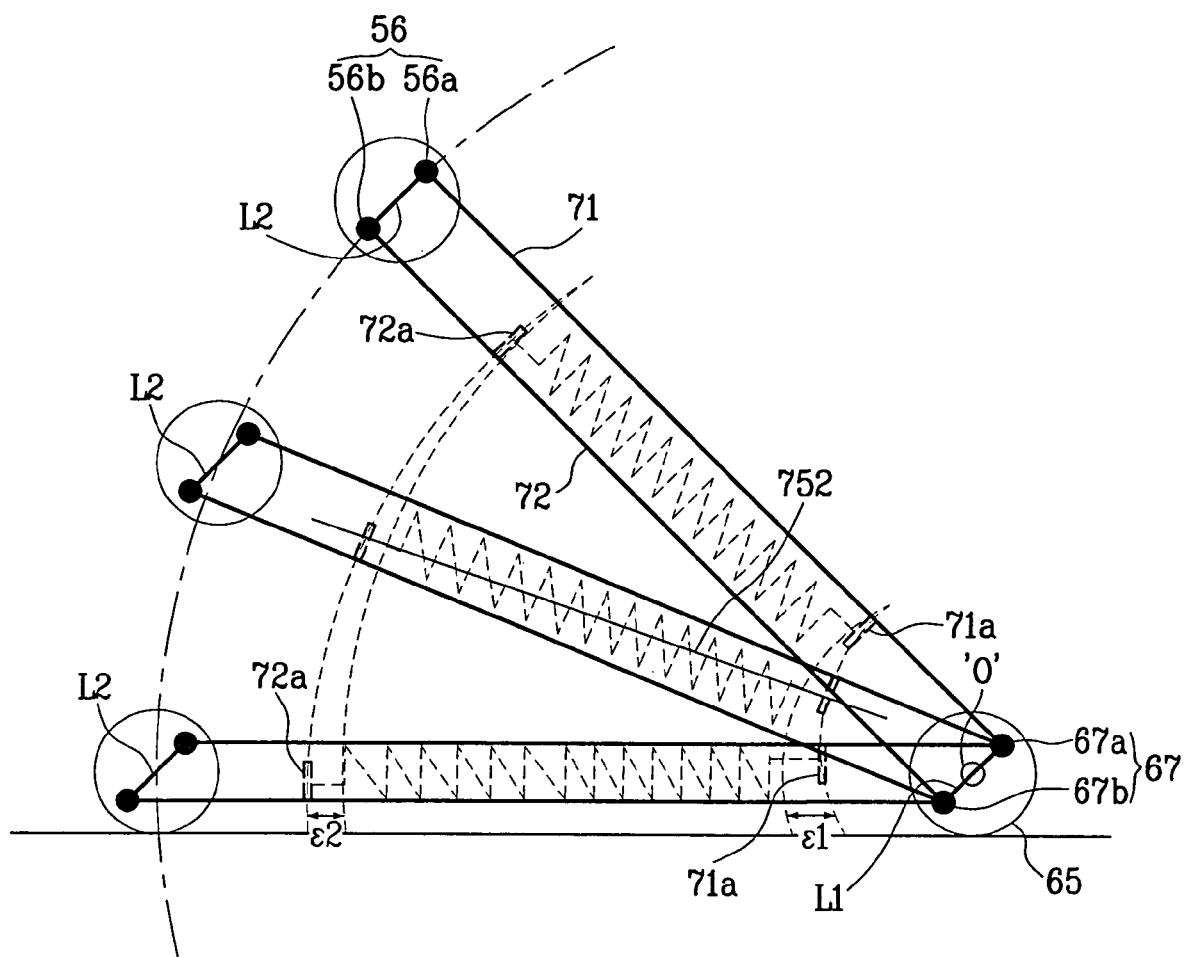
FIG. 9 illustrates a diagram for explaining action of first, and second link members, and rotating member following tilting angle adjustment operation of a stand, schematically.

Referring to FIG. 9, it is preferable that the connection pins 56, and 67 of the first, and second link bars 71, and 72 have a phase difference of 180° from each other. Since the link bars 71, and 72 have the same lengths and parallel to each other, a line segment L1 between the connection pins 67 of the second base bracket 65, and a line segment L2 between the connection pins 56 of the rotating member 55 are parallel to each other.

In the meantime, in the stand assembly of this embodiment, the opposite ends of the first, and second link members 71, and 72 are connected to different planes perpendicular both to the planes of the monitor and the base of the rotating member 55 and the second base bracket 65. However, the opposite ends of the first, and second link members 71, and 72 are connected to the same plane perpendicular both to the planes of the monitor and the base of the rotating member 55 and the second base bracket 65.

The operation of the foregoing stand assembly will be described.

Figure 7:
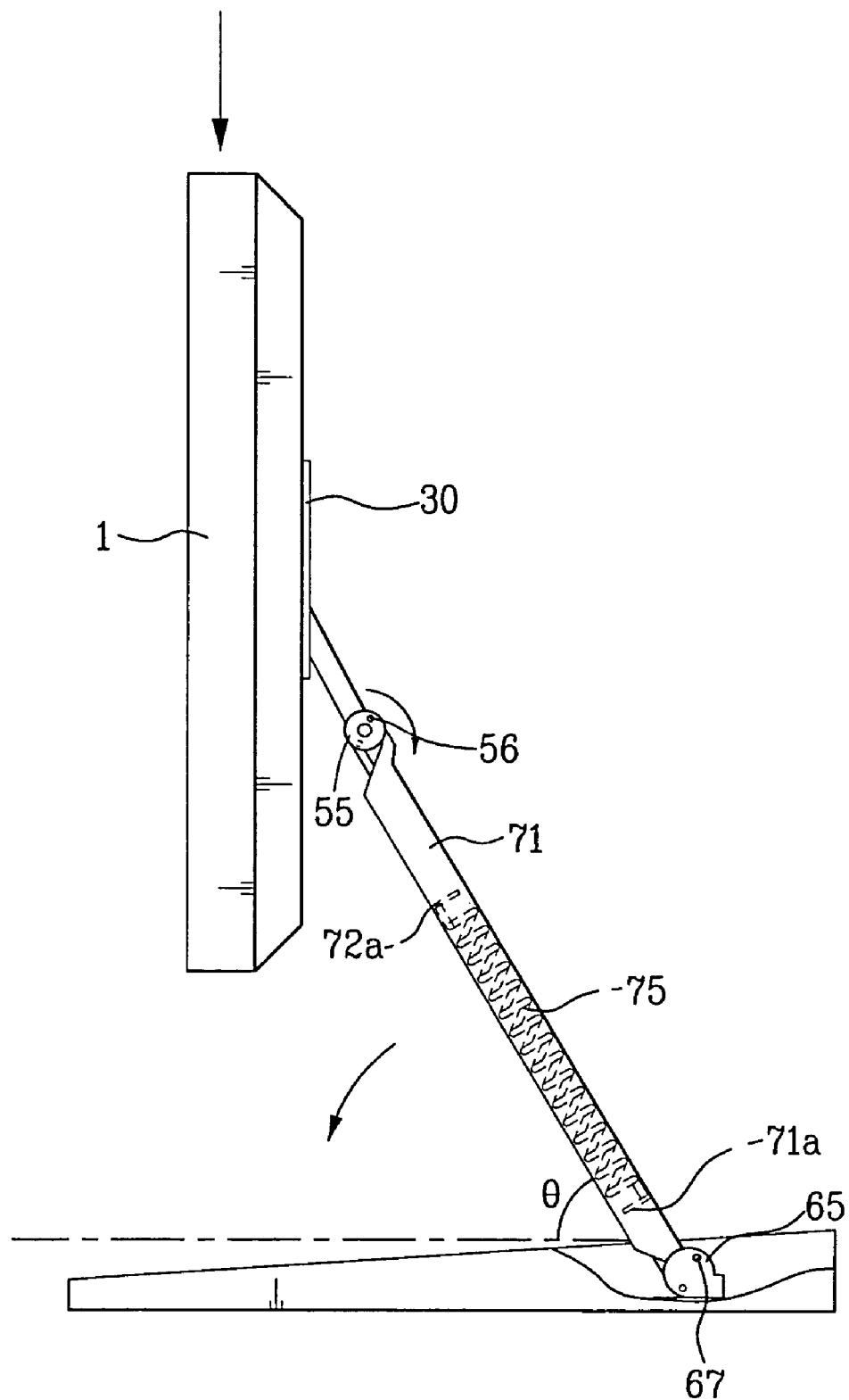
FIGS. 7 and 8 each illustrates a side view showing a stand tilting angle adjustment operation of the stand assembly in FIG. 3, schematically.
Figure 8:
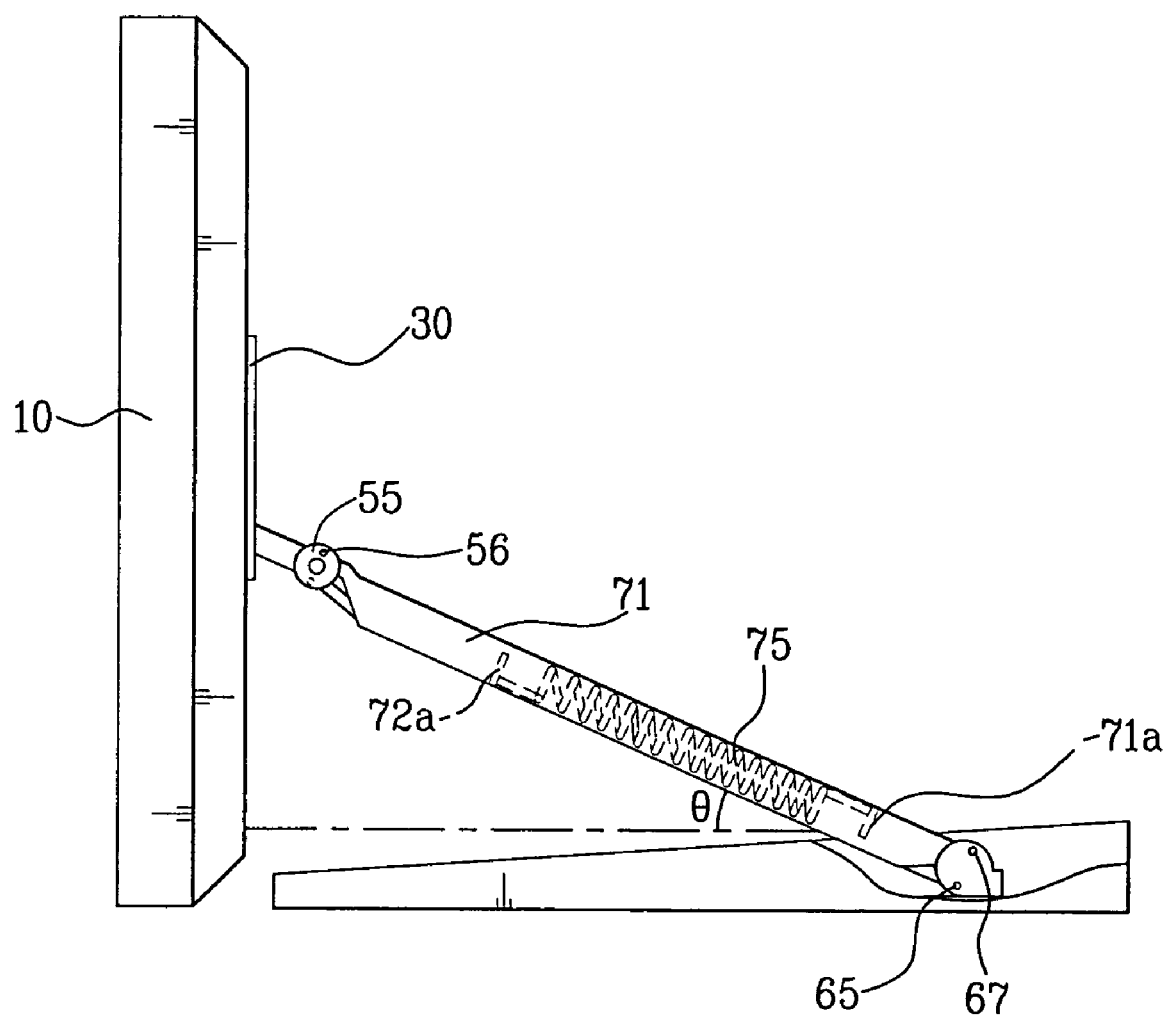

The tilting angle adjustment of the stand 40 with respect to the base 20 will be described. When the monitor body 1 and the stand 40 are in a state as shown in FIG. 7, if the user holds, and applies force to, the monitor body 1, to move the stand 40 in a direction of an arrow, the stand 40 rotates about the first lower hinge shaft 62 (see FIG. 5), and the second lower hinge shaft 64 (see FIG. 5) until the stand 40 is in a state as shown in FIG. 8.

In this instance, the lower torsion spring 63 (see FIG. 3) and the disc spring 66 (see FIG. 3) generate torques in a direction opposite to rotation of the stand 40, and maintain the stand 40 in an adjusted state at a predetermined angle.

In the meantime, if the stand 40 moves in the arrow direction, an angle between the monitor body 1 and the base 20 can be maintained as it is as the rotating member 55 and the upper hinge shaft 51 rotate about the stand 40 because lower ends of the first, and second link bars 71, and 72 are fixed to the second base bracket 65.

In other words, if the stand 40 is rotated about the first, and second hinge shafts 62, and 64 of the base hinge 60, as shown in FIG. 9, since the first, and second link members 71, and 72 have the same lengths, and are parallel to each other, the ling segment L2 between the connection pins 56 of the rotating member 55 and the line segment L1 between the connection pins 67 of the second base bracket 65 are always parallel to each other. This implies that the line segment L2 between the connection pins 56 of the rotating member 55 always has a fixed angle to the ground. According to this, if the stand 40 is rotated, the rotating member 55 coupled to the first, and second link bars 71, and 72 is rotated, and the monitor body 1 coupled to the rotating member 55 with the upper hinge shaft 51 is rotated with respect to the stand 40, to maintain a fixed angle with respect to the ground.

In the meantime, since the first, and second link members 71, and 72 have different centers of rotation, when the first, and second link members 71, and 72 rotate at the same time, a distance between the holding pieces 71a, and 72a varies with a rotation angle. In more detail, when the first, and second link members 71, and 72 rotate with the stand 40, since the first link member 71 rotates about the upper connection pin 67a away from an axis 'o' of the first and second hinge shafts 62, and 64 in an upper direction, the holding piece 71a moves down by a predetermined distance F1. Opposite to this, since the second link member 72 rotates about the lower connection pin 67b away from an axis 'o' of the first and second hinge shafts 62, and 64 in a lower direction, the holding piece 72a moves up by a predetermined distance ϵ2.

Therefore, the smaller the angle between the base 20 and the stand 40, the greater a distance between the holding pieces 71a, and 72a, and the tension spring 75 extends as much, to exert the elastic force as much.

Figure 10:
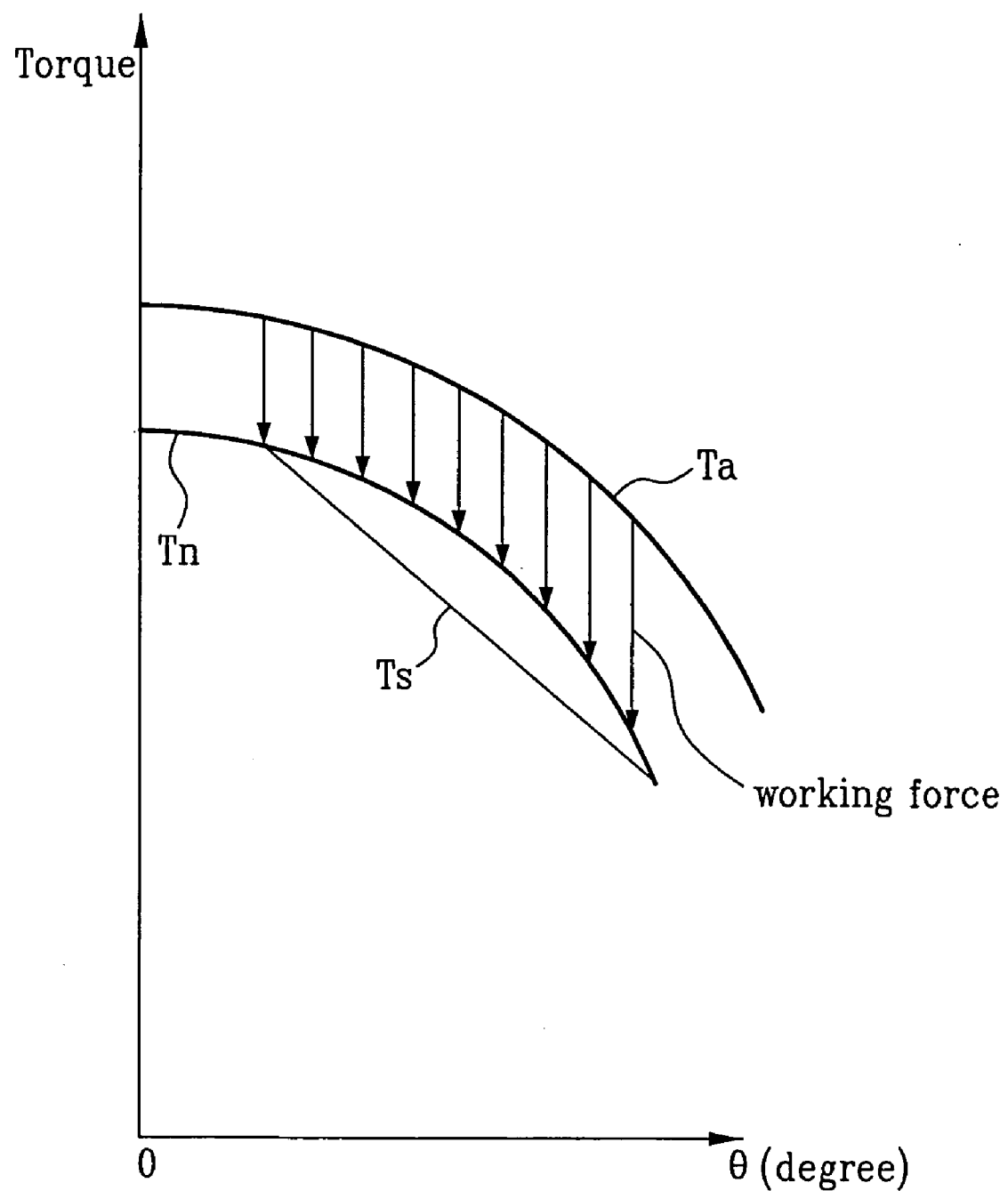
FIG. 10 illustrates a graph showing a required torque vs. an actual available torque of a stand assembly in accordance with a preferred embodiment of the present invention.

In this instance, since a line segment 752 connecting opposite ends of the tension spring 75 is in a diagonal direction of the first, and second link members 71, and 72, the elastic force also acts in the diagonal direction. Of the components of the elastic force acting in the diagonal direction thus, there is a component acting in a direction of the torque of the stand 40, which is added to the torques of the elastic force of the torsion spring 63 (see FIG. 3) and the friction of the disc springs 66 (see FIG. 3), to develop a non-linear locus of a total torque Ta as shown in FIG. 10.

By making an appropriate adjustment of a spring constant of the tension spring 75, a distance between the first, and second hinge shafts 62, and 64 and the connection pins 67, and positions of the holding pieces 71a, and 72a, a torque from the elastic force of the tension spring 75 can be adjusted to follow a locus identical to a locus of a required torque Tn.

Thus, when the tilting angle of the stand 40 is varied, the present invention can generate an ideal overall torque by a sum of the torque of the torsion spring 63, the torque from friction of the disc springs 66, and the torque from the elastic force of the tension spring 75 varied as the tension spring 75 contracts or extends, to require application of a smooth working force.

Moreover, though the plurality of tension springs 66 are used for generating the torque of friction at the base hinge, different from this, a curling spring (not shown) having one opened end can be inserted in the insertion hole in the lower end of the stand 40 having the second hinge shaft 64 passed therethrough, for generating torque by friction between an inside circumferential surface of the curling spring and an outside circumferential surface of the second lower hinge shaft.

Next, adjustment of a rotation angle of the monitor body 1 with respect to the stand 40 will be described, with reference to FIG. 11.

Figure 11:
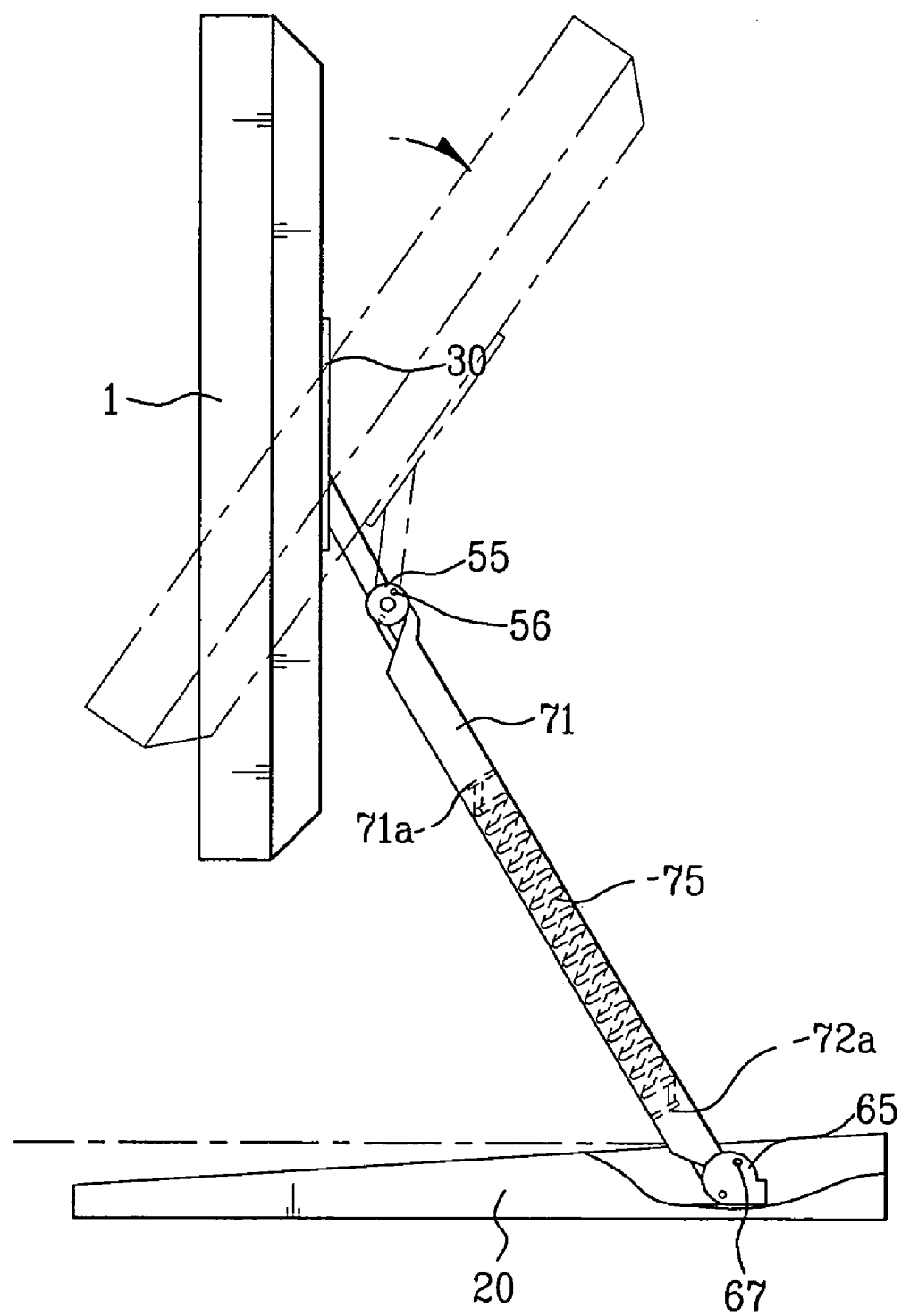
FIG. 11 illustrates a side view showing a rotation angle adjustment operation of the monitor body by the stand assembly in FIG. 3, schematically.

Referring to FIG. 11, when the monitor body 1 is pushed/pulled in forward/backward, the pivot bracket 30 fixedly secured to the monitor body 1 rotates about the upper hinge shaft 51.

In this instance, referring to FIGS. 5 and 6, because an inside circumferential surface of the inserting hole 31 of the pivot bracket 30 is in contact with an outside circumferential surface of the upper hinge shaft 51 at a predetermined friction, the disc springs 52 are in contact with an outside surface of the pivot bracket 30 at a predetermined friction, and the torsion spring 53 supports the pivot bracket 30 against stand 40 elastically, making a torque to act in a direction opposite to a direction of movement of the pivot bracket 30 caused by the friction and the elastic force, the monitor body 1 can maintain a tilting angle adjusted state with respect to the stand 40 even if an external force is removed.

If the monitor body 1 is kept tilting forward with respect to the stand 40, that is, if the monitor body 1 is tilted more than a predetermined angle with respect to the stand 40, a front end of the step 32 of the pivot bracket 30 meets with the stopper tip 57a on the stopper 57, to limit anymore rotation of the monitor body 1.

Figure 12:
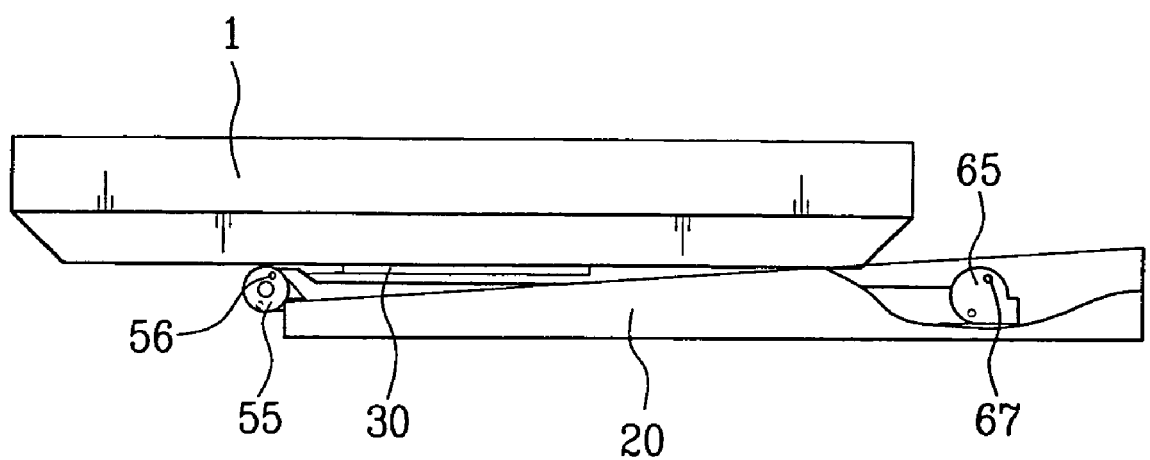
FIG. 12 illustrates a side view of a folded state of the stand assembly in FIG. 3, schematically.

By making appropriate design of a rotation range of the stand 40 with respect to the base 20, and a rotation range of the stand 40 with respect to the monitor body 1, the monitor having the stand assembly of the present invention applied thereto can be provided with a folding function in which the monitor body 1 is folded on the base 20 completely as shown in FIG. 12.

In the meantime, in the foregoing embodiment of the stand assembly, by mounting the tension spring 75 between the first, and second link bars 71, and 72, the torque generated at the time of tilting angle adjustment is made to be non-linear. However, different from above, in a case the positions of the holding pieces 71a, and 72a of the first, and second link bars 71, and 72 are opposite to the present positions, i.e., a holding piece is formed at an upper side of the first link bar 71, and a holding piece is formed at a lower side of the second link bar 72, it is required to provide a compression spring.

Figure 13:
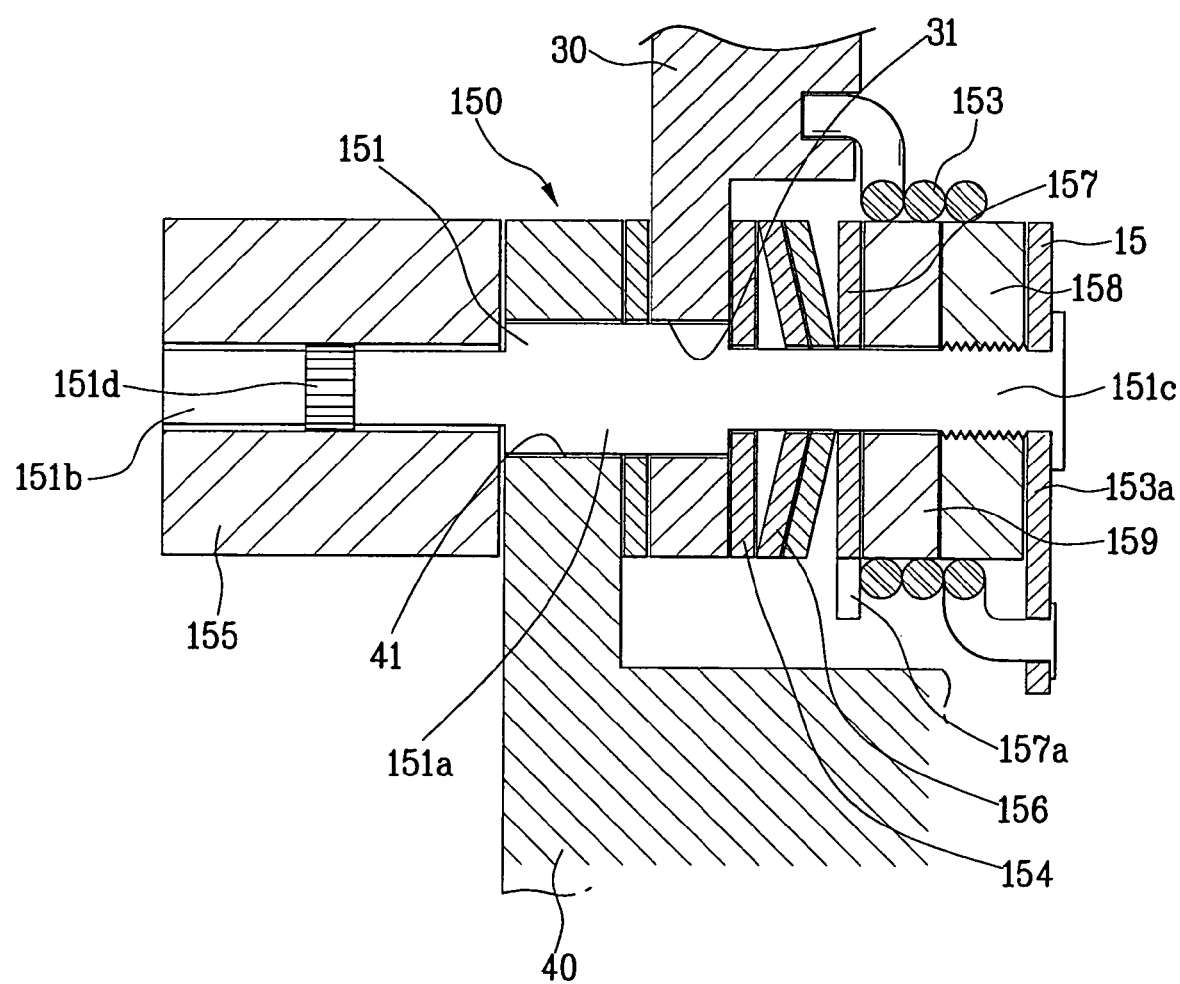
FIG. 13 illustrates a section of key parts of a stand assembly for a monitor in accordance with another preferred embodiment of the present invention.

Next, a stand assembly in accordance with another preferred embodiment of the present invention will be described with reference to FIG. 13.

The stand assembly of this embodiment has a configuration basically identical to the stand assembly of the foregoing embodiment, except that the stand assembly of this embodiment is different from the stand assembly of the foregoing embodiment in a configuration of a monitor hinge 150.

The monitor hinge 150 of this embodiment has an upper hinge shaft 151 with a cylindrical middle portion 151a, and opposite cut flat sides 151b, 151c. The cylindrical portion 151a of the upper hinge shaft 151 is in close contact both with an insertion hole 41 in the stand 40 and an insertion hole 31 in a pivot bracket 30. Of the opposite cut flat side portions, one side portion 151b is forcibly inserted in, and secured to a rotating member 155. The upper hinge shaft 151 in the rotating member 155 has a knurled portion 151*d* at one side flat portion 151*b*. The knurled portion 151*d* digs into an inside surface of the rotating member 155 when the upper hinge shaft 151 is forcibly inserted into the rotating member 155, so that there is no play between the upper hinge shaft 151 and the rotating member 155.

In the meantime, the other side flat portion 151*c* of the upper hinge shaft 151 has a flat washer 154, a plurality of disc springs 156, and a stopper 157 mounted thereon in succession. There is a nut 158 at an outer side of the stopper 157 threaded on the hinge shaft 151, and between the nut 158 and the stopper 157, there is a bushing 159 for bringing the disc springs 156 and the flat washers into close contact with the pivot bracket 30.

Moreover, on the upper hinge shaft 151, there is a torsion spring 153 mounted to surround outside circumferential surfaces of the bushing 159 and the nut 158. The torsion spring 153 has one end secured to the pivot bracket 30, and the other end secured to a holding plate 153*a* mounted to an outer side of the nut 158, to support the pivot bracket 30 against the hinge shaft 151, elastically.

Accordingly, when the pivot bracket 30 is rotated about the upper hinge shaft 151, a torque acts in a direction opposite to a direction of rotation of the pivot bracket 30 caused by the friction of the disc springs 156, and the elastic force of the torsion spring 153, so that the monitor body 1 (see FIG. 7) maintains an angle tilted state with respect to the stand 40.

Figure 14:
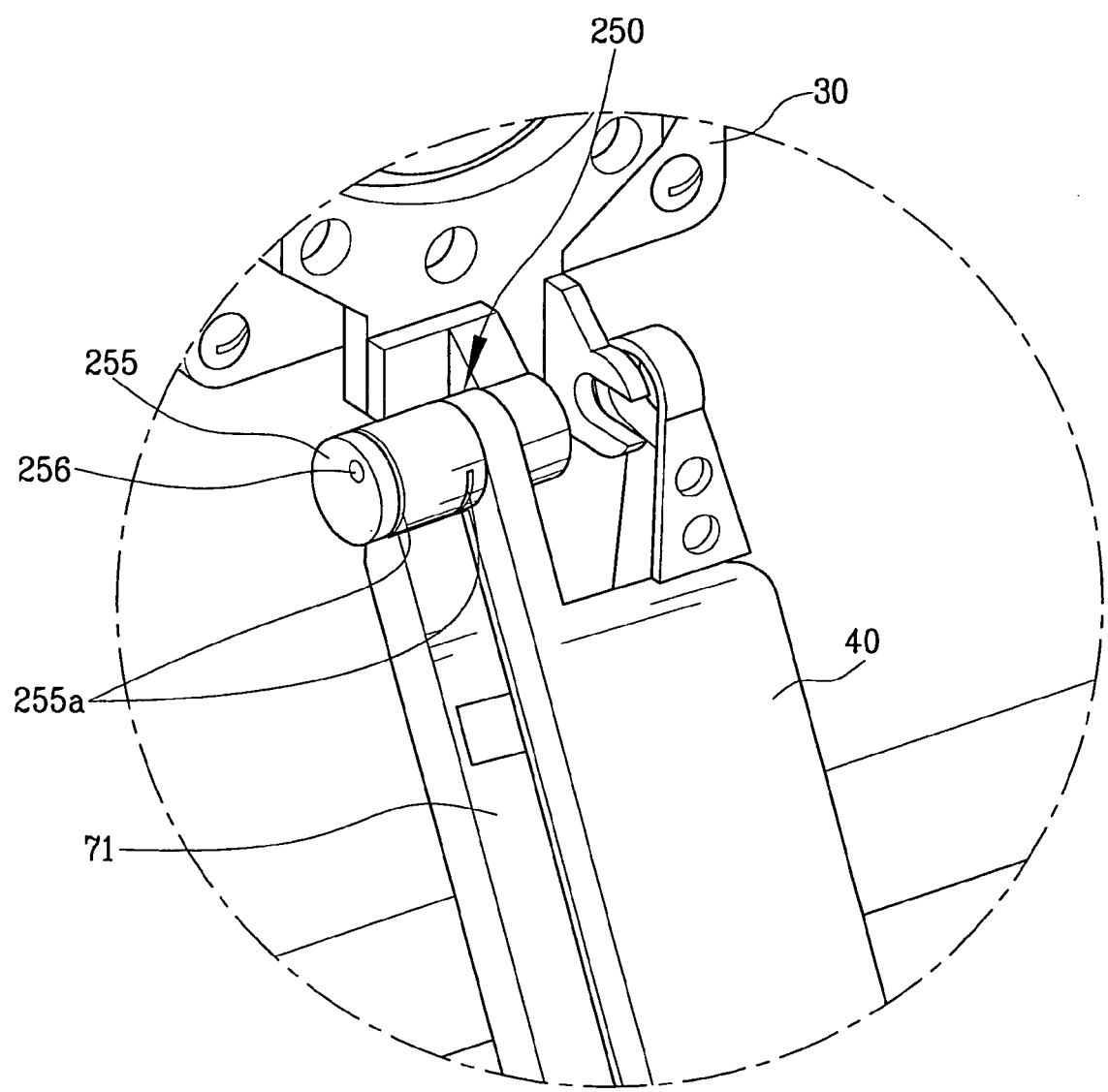
FIG. 14 illustrates a perspective view of a stand assembly for a monitor in accordance with another preferred embodiment of the present invention.
Figure 15:
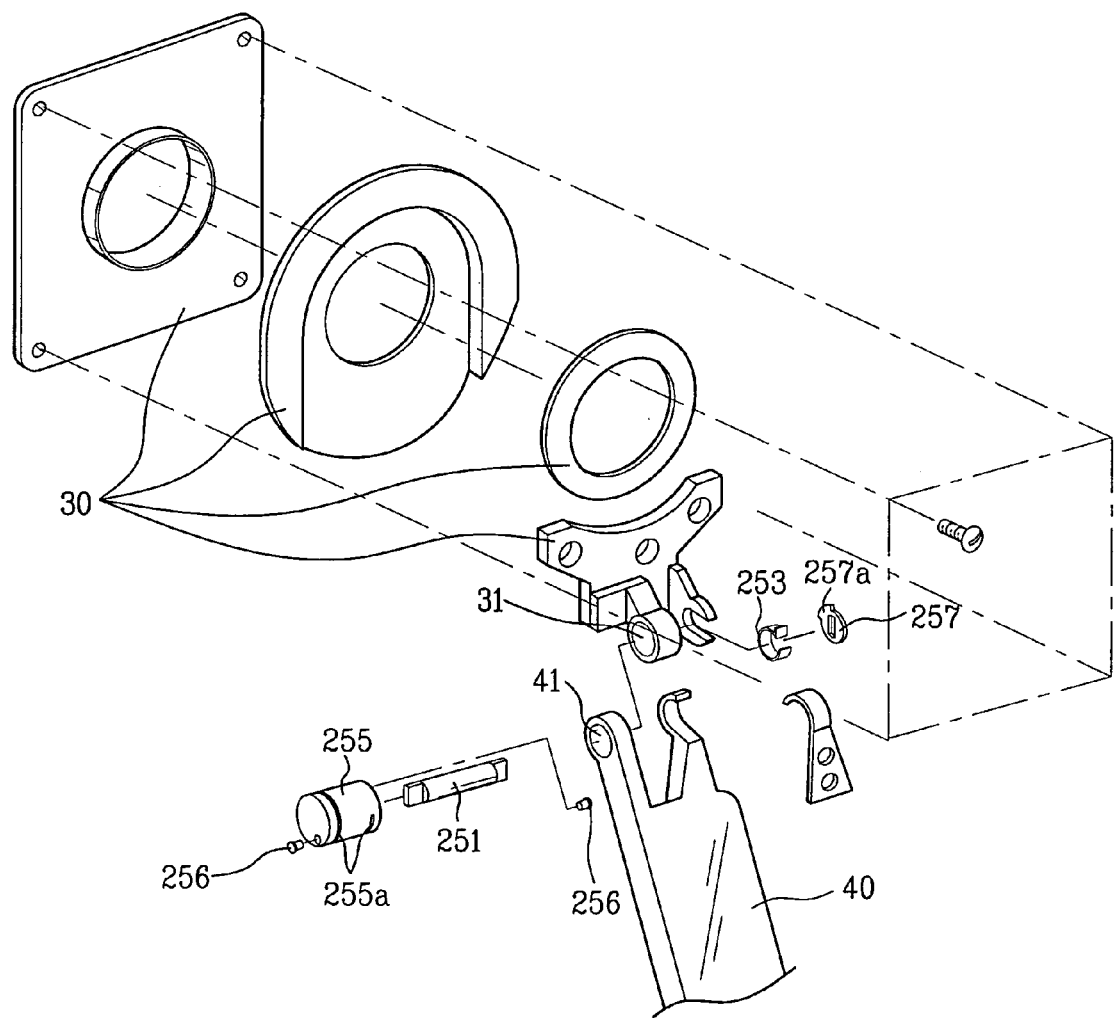
FIG. 15 illustrates a disassembled perspective view of the monitor hinge of the stand assembly for a monitor in FIG. 14.

A stand assembly in accordance with another preferred embodiment of the present invention will be described with reference to FIGS. 14 and 15.

The stand assembly of this embodiment also has a configuration basically identical to the stand assembly of the foregoing embodiment, except that the stand assembly of this embodiment is different from the stand assembly of the foregoing embodiment in a configuration of a monitor hinge 250.

The monitor hinge 250 of this embodiment has an upper hinge shaft 251 passed through and secured both to an insertion hole 31 in a lower end of a pivot bracket 30, and an insertion hole 41 in one side of an upper end of the stand 40. On an inside circumference of the insertion hole 31 in the pivot bracket 30, there is a curling spring 253 in close contact with an outside circumferential surface of the upper hinge shaft 251 for generating a predetermined friction. Moreover, there is a stopper 257 at one end portion of the upper hinge shaft 251, for adjusting a rotation angle of the monitor body 1 (see FIG. 10) with respect to the upper hinge shaft 251.

The curling spring 253 has a ring shape with one opened side, and inserted in the insertion hole 31 in the pivot bracket 30.

Alike the foregoing embodiment, the stopper 257 has a stopper tip 257*a* on an outside circumference. The stopper 257 limits a rotation angle of the monitor body 1 as the stopper 257 is brought into contact with the step 32 (see FIG. 4) in a lower end of the pivot bracket 30 having the hinge shaft passed therethrough.

The foregoing stand assembly is operated as follows.

As described before, the stand assembly of this embodiment is different from the foregoing embodiment only in the configuration of the monitor hinge shaft 150. Therefore, the tilting angle adjustment of the stand 40 with respect to the base 20 (see FIG. 7) is identical to the foregoing embodiment, description of which will be omitted.

When the monitor body 1 (see FIG. 10) is rotated in up/down direction with respect to the stand 40, the pivot bracket 30 rotates about the upper hinge shaft 251. In this instance, since the upper hinge shaft 251 is in close contact with an inside circumferential surface of the curling spring 253 inside of the pivot bracket 30, there is friction between the pivot bracket 30, the curling spring 253, and the upper hinge shaft 251. Since this friction generates a torque in a direction opposite to the movement of the pivot bracket 30, even if an external force is removed, the monitor body 1 can maintain an angle adjusted state with respect to the stand 40.

The stand assembly for a monitor of the present invention has the following advantages.

First, the non-linear working force applied equivalent to a required torque in adjustment of the tilting angle of the stand with respect to the base permits the user to adjust the tilting angle of the stand smoothly with a uniform force, easily.

Second, the easy, and smooth stand tilting angle adjustment throughout an entire range of operation eliminates the problems of throwing the stand backward due to excessive force in a process the user adjusts the tilting angle, and the like.

Third, since the elastic member mounted between the first, and second link bars takes a portion of the torque in adjustment of the tilting angle of the stand, an elastic force the torsion spring of the base hinge is required to take can be reduced, enabling to reduce a size of the torsion spring, with subsequent reduction of the base hinge, which is favorable for producing a slim monitor.

Though a flat monitor has been described in the foregoing embodiment, the present invention is not limited to this. The present invention is applicable to a Brown tube type monitor in similar or identical fashion. However, in this case, it is preferable that various parts of the stand assembly are reinforced properly taking weight of the monitor into account.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A stand assembly for a monitor, comprising:
   a stand having an upper end for receiving a monitor body of the monitor and a lower end for receiving a base, the upper and lower ends being respectively configured to enable a first rotatable coupling about a first rotation axis of the monitor body with respect to the stand and a second rotatable coupling about a second rotation axis of the stand with respect to the base; and
   torque correcting means for generating a torque non-linearly varied with the rotation of the stand about the second rotation axis, said torque correcting means including:
      a rotating member rotatably coupled to the upper end of the stand;
      a first link bar and a second link bar, each having a first end connected through a portion of said first link bar to the lower end of the stand and a second end connected through a portion of said second link bar to the rotating member; and
      an elastic member having a first end coupled to the first link bar and a second end coupled to the second link bar.

2. The stand assembly as claimed in claim 1, further comprising:

at least one of friction torque generating means for generating a friction torque at the second rotatable coupling or torsional torque generating means for generating a torsional torque at the second rotatable coupling.

3. The stand assembly as claimed in claim 1, further comprising:
at least one of friction torque generating means for generating a friction torque at the first rotatable coupling or torsional torque generating means for generating a torsional torque at the first rotatable coupling.

4. The stand assembly as claimed in claim 2 or 3, wherein the friction torque generating means is at least one combination of disc springs arranged substantially vertical to a rotation direction and a curling spring arranged in a direction the same with the rotation direction.

5. The stand assembly as claimed in claim 2 or 3, wherein the elastic member is a torsion spring.

6. The stand assembly as claimed in claim 1, wherein the first end of said elastic member is rotatably coupled to the first link bar at a point offset from the first rotation axis, and the second end of said elastic member is rotatably coupled to the second link bar at a point offset from the second rotation axis, the rotation of the stand about the second rotation axis causing a variation in a length of the elastic member and generating a corresponding elastic force relative to the non-linearly varied torque.

7. The stand assembly as claimed in claim 1, wherein the elastic member is configured to apply elastic force to the first and second link bars in a diagonal direction.

8. The stand assembly as claimed in claim 7, wherein a length of the first link bar is equal to a length of the second link bar.

9. The stand assembly as claimed in claim 7, wherein the first link bar and the second link bar are arranged in parallel and are configured to move in separate planes.

10. The stand assembly as claimed in claim 7, wherein each of the first link bar and the second link bar has an 'L' shaped cross-section.

11. The stand assembly as claimed in claim 1, wherein the first and second link bars each comprises a holding piece, each holding piece being configured to secure a respective end of the elastic member.

12. The stand assembly as claimed in claim 1, wherein the elastic member is a tension spring.

13. The stand assembly as claimed in claim 7, wherein the elastic member is a compression spring.

14. The stand assembly as claimed in claim 1, wherein the rotating member enables a rotatable coupling of the stand to the monitor body.

15. The stand assembly as claimed in claim 1, further comprising:
a base bracket configured to be fixed to the base and rotatably coupled to the first ends of the first and second link bars rotatably coupled thereto; and
a base hinge shaft configured to rotatably couple the lower end of the stand and the base bracket and to engage with a torsion spring having one end secured to the stand and another end secured to the base bracket.

16. The stand assembly as claimed in claim 15, further comprising a friction generating member for generating friction between the stand and the base hinge shaft.

17. The stand assembly as claimed in claim 16, wherein the friction generating member includes a plurality of disc springs, each disc spring having a conical annular shape configured to receive the base hinge shaft, wherein the plurality of disc springs are configured to generate friction in response to close contact with the stand.

18. The stand assembly as claimed in claim 16, wherein the friction generating member includes a curling spring configured to be inserted into and secured to a corresponding insertion hole in the stand so as to receive the base hinge shaft therein and generate friction by being brought into close contact with an outer circumferential surface of the base hinge shaft.

19. A stand assembly for a monitor comprising:
a stand having an upper end configured to be coupled to a monitor body of the monitor and a lower end configured to be coupled to a base, the upper and lower ends respectively enabling a rotatable coupling with respect to each of the monitor body and the base;
a monitor hinge configured to be coupled to the upper end of the stand, the monitor hinge having a monitor hinge shaft configured to rotatably couple the upper end of the stand to the monitor body;
a base hinge configured to rotatably couple the lower end of the stand to the base;
a rotating member configured to be rotatably coupled to the upper end of the stand;
a first link bar and a second link bar arranged parallel to each other, each of the first and second link bars having a first end thereof connected to the rotating member and a second end thereof connected to the base hinge; and
an elastic member having a first end thereof secured to the first link bar and a second end thereof secured to the second link bar, wherein the elastic member is configured to apply an elastic force to the first and second link bars based on a tilting angle of the stand.

20. The stand assembly as claimed in claim 19, wherein the elastic member is configured to apply an elastic force to the first and second link bars in a diagonal direction.

21. The stand assembly as claimed in claim 19, wherein a length of the first link bar is equal to a length of the second link bar.

22. The stand assembly as claimed in claim 19, wherein the first link bar and the second link bar are configured to move in separate planes.

23. The stand assembly as claimed in claim 19, wherein each of the first link bar and the second link bar has an 'L' shaped cross-section.

24. The stand assembly as claimed in claim 19, wherein the first and second link bars each comprises a holding piece, each holding piece being configured to secure a respective end of the elastic member.

25. The stand assembly as claimed in claim 19, wherein the elastic member is a tension spring.

26. The stand assembly as claimed in claim 19, wherein the elastic member is a compression spring.

27. The stand assembly as claimed in claim 19, wherein the base hinge comprises:
a base bracket configured to be fixed to the base and rotatably coupled to the first ends of the first and second link bars; and
a base hinge shaft configured to rotatably couple the lower end of the stand to the base bracket, and to engage with a torsion spring having one end thereof secured to the stand and another end thereof secured to the base bracket.

28. The stand assembly as claimed in claim 27, further comprising a friction generating member configured to be coupled to the lower end of the stand and to generate friction between the stand and the base hinge shaft.

29. The stand assembly as claimed in claim 28, wherein the friction generating member includes a plurality of disc springs configured to receive the base hinge shaft and to generate friction by being brought into close contact with the stand.

30. The stand assembly as claimed in claim 29, wherein the disc springs each have a conical annular shape.

31. The stand assembly as claimed in claim 28, wherein the friction generating member includes a curling spring configured to be inserted into and secured to a corresponding insertion hole formed in the stand so as to receive the base hinge shaft therein and generate friction by being brought into close contact with an outer circumferential surface of the base hinge shaft.

32. The stand assembly as claimed in claim 19, wherein the base hinge comprises:
a first base bracket configured to be fixed to the base;
a first hinge shaft configured to be fixed to the first base bracket and to be received by a first side of the lower end of the stand;
a torsion spring configured to be coupled to the first hinge shaft, the torsion spring being positioned between the first base bracket and the first hinge shaft;
a second base bracket configured to be connected to the first ends of the first and second link bars; and
a second hinge shaft configured to be received by each of the second base bracket and a second side of the lower end of the stand.

33. The stand assembly as claimed in claim 32, further comprising a plurality of disc springs configured to receive the second hinge shaft and to generate friction by being brought into close contact with the lower end of the stand.

34. The stand assembly as claimed in claim 33, wherein the plurality of disc springs each have a conical annular shape.

35. The stand assembly as claimed in claim 19, wherein the rotating member is configured to be secured to the monitor hinge shaft.

36. The stand assembly as claimed in claim 19, further comprising:
a friction generating member configured to generate friction between the monitor hinge shaft and a pivot bracket connected to the monitor body.

37. The stand assembly as claimed in claim 36, wherein the friction generating member comprises:
at least one disc spring configured to receive the monitor hinge shaft, and to generate friction by being brought into close contact with the pivot bracket; and
a close contact member configured to bring the at least one disc spring into close contact with the pivot bracket.

38. The stand assembly as claimed in claim 37, wherein the close contact member includes a nut threadably engaged with one end of the monitor hinge shaft.

39. The stand assembly as claimed in claim 36, wherein the friction generating member includes a curling spring inserted in, and secured to the insertion hole in the monitor bracket having the hinge shaft passed therethrough, for bringing into close contact with an outside circumferential surface of the hinge shaft, to generate predetermined friction.

40. The stand assembly as claimed in claim 36, wherein the monitor hinge further includes; a stopper fixed secured to the hinge shaft, the stopper having a stopper tip projected outwardly, and a step projected from the monitor bracket for bringing into contact with, and holding the stopper tip, to limit rotation of the monitor body with respect to the hinge shaft.

41. The stand assembly as claimed in claim 36, further comprising:
a torsion spring provided between the pivot bracket and the monitor hinge shaft and configured to elastically support the pivot bracket with respect to the hinge shaft.

42. The stand assembly as claimed in claim 41, wherein the torsion spring is configured to encircle an outer circumference of the friction generating member.

43. A stand assembly for a monitor, comprising:
a stand having an upper end configured to be rotatably coupled to a monitor body of the monitor, and a lower end configured to be rotatably coupled to a base;
a monitor hinge configured to be coupled to the upper end of the stand and having a monitor hinge shaft configured to rotatably couple the upper end of the stand to the monitor body;
a base hinge configured to be coupled to the lower end of the stand and having a base hinge shaft configured to rotatably couple the lower end of the stand to the base;
a friction generating member mounted on the base hinge shaft and configured to generate friction by being brought into close contact with the stand;
a torsion spring, mounted on the base hinge and configured to elastically support the stand with respect to the base hinge;
a rotating member secured to the monitor hinge shaft;
a first link bar and a second link bar arranged parallel to each other, each of the first and second link bars having a first end thereof configured to be connected to the rotating member and a second end thereof configured to be connected to the base hinge; and
an elastic member having a first end thereof secured to the first link bar and a second end thereof secured to the second link bar, wherein the elastic member is configured to apply an elastic force to the first and second link bars according to a tilting angle of the stand.

44. The stand assembly as claimed in claim 43, wherein the friction generating member includes a plurality of disc springs, each disc spring having a conical annular shape configured to receive the base hinge shaft so as to generate friction by being brought into close contact with the stand.

45. The stand assembly as claimed in claim 43, wherein the friction generating member includes a curling spring configured to be inserted into and secured to a corresponding insertion hole in the stand and to receive the base hinge shaft therein, wherein the curling spring is configured to generate friction by being brought into close contact with an outer circumferential surface of the base hinge shaft.

* * * * *